Dec. 26, 1950

R. M. M. OBERMAN

CIRCUIT ARRANGEMENT FOR A SUBSCRIBER'S SET OF A TELEGRAPH SYSTEM

Filed July 30, 1947

2,535,652

INVENTOR.

Roelof Maarten Marie Oberman

BY

Michael S. Striker

Agent

Patented Dec. 26, 1950

2,535,652

UNITED STATES PATENT OFFICE 2,535,652

CIRCUIT ARRANGEMENT FOR A SUBSCRIBER'S SET OF A TELEGRAPH SYSTEM

Roelof M. M. Oberman, The Hague, Netherlands

Application July 30, 1947, Serial No. 767,522
In the Netherlands March 19, 1943

Section 1, Public Law 690, August 8, 1946
Patent expires March 19, 1963

3 Claims. (Cl. 178—2)

Figure 1:
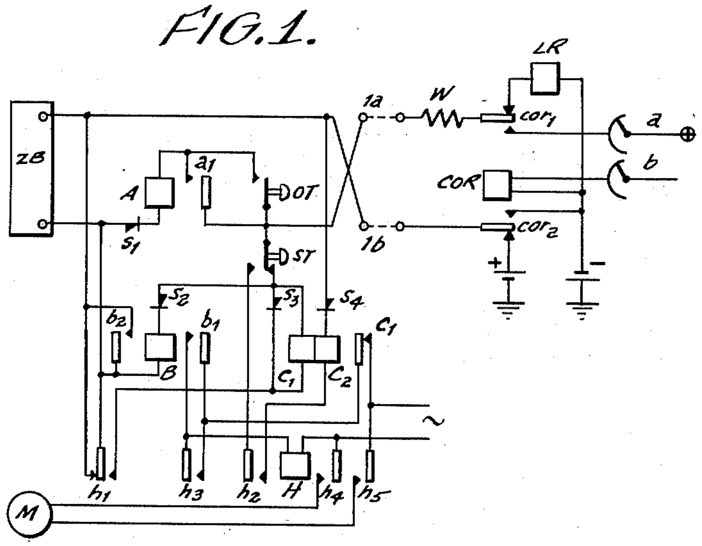

This invention relates to an arrangement for a subscriber's set of a manually operated or automatic telegraph system, in which the telegraph signals and the various selecting signals are transmitted as direct current impulses.

In the arrangement of the subscriber's sets of such systems the current direction in the subscriber's loop is applied to discern between the operative and the non-operative condition of the subscriber's set by means of a polarized relay. The former arrangements of this kind are equipped with a condenser which is inserted in the circuit in the non-operative position so that no current flows in this circuit.

The subscriber's set is switched into the operative position or called by inverting the current potential in the central equipment and thus in the circuit to this set. The resulting charging impulse of the condenser moves the armature of the polarized relay over in the subscriber's set as a result of which this set comes in the operative condition. The subscriber himself can effect a call by shortcircuiting the condenser. The resulting current in the subscriber's line forms the calling criterion in the central equipment.

This arrangement which uses a charging impulse as calling criterion causes difficulties especially with circuits of great length. The rather sensitive polarized relay is always de-energized in the non-operative condition of this set, so that a slight influence from outside causes an undesired starting of the teleprinter resulting in a false call in the central equipment.

From a technical point of view this arrangement was efficiently improved by replacing the condenser by a high resistance in the subscriber's set allowing a current of about 5 mA. to flow in the subscriber's loop in the non-operative condition. The polarized relay in the subscriber's set is locked by this spacing current.

The subscriber's set according to this arrangement has some drawbacks. The spacing current of 5 mA. in the subscriber's set is hardly a handicap for a single telegraph circuit; the subscriber's using spacing current is, however not admissible for larger telegraph exchanges operated manually or automatically. Moreover, the polarized relay in the subscriber's set is expensive, while careful maintenance is required.

The arrangement according to the present invention avoids the above mentioned drawbacks by replacing the polarized relay, which characterizes the operative and non-operative condition of the subscriber's set, by two non-polarized telephone relays, i. e. a switching-in and a switching-off relay.

In cooperation with blocking cells these two relays perform the necessary switching functions. They may be of a simple design, e. g. of the type applied in great numbers for the line and cut-off relays in telephone exchanges.

The winding is normal, so that these two relays with the necessary blocking cells are much cheaper than the polarized relay.

The two relays and the corresponding blocking cells require about as much room as the polarized relays with the corresponding resistances. The invention will be explained further by means of some figures.

Figure 2:
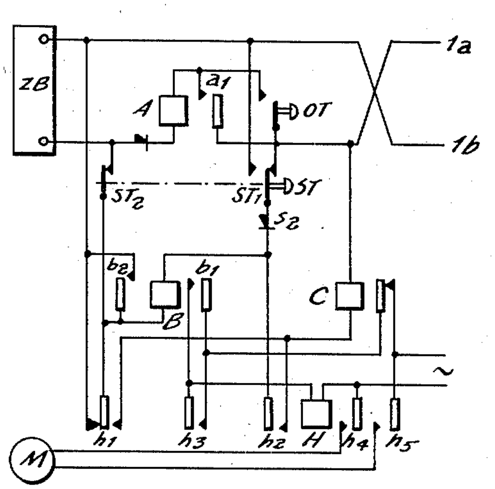

Fig. 1 illustrates the principle of the arrangement of the subscriber's set and the line and cut-off relays of an automatic exchange; and Fig. 2 shows the arrangement of a subscriber's set, in which a more economical use is made of materials by combining some parts.

After the following detailed description of the operation of a subscriber's set according to the invention it will be possible for an expert in arrangement technique to apply this method to more complicated subscriber's sets or to apply it in a modified form in connection with other selecting criteria.

In Fig. 1 the subscriber's set is shown in detail only as far as necessary for explanation of the invention. It cooperates with an automatic exchange according to the call finder system. The system of the automatic telegraph exchange or the manually operated central switchboard is of no importance for the invention. The arrangement is shown with the subscriber's set in the non-operative condition. The cell S1 is so arranged that in the shown position it has a blocking function. Pressing the calling key OT results in the operation of the relay A in the subscriber's set and the relay LR in the exchange in a circuit from battery, winding of relay LR, the contact *cor1*, resistance W, conductor *1a*, to the subscriber's set and in this set over the calling key OT, cell S1, relay A, back-contact *h1*, to the exchange over conductor *1b*, and over contact *cor2* to +battery. The contact *a1* closes a circuit for its relay A in shunt to the calling key OT so that this key can be released. Dependent on the resistances of the relay A and LR the current in the line will be about 30 to 40 mA.

When a call is made the operation of the relay LR starts one call finder or a group of call finders in the automatic exchange in a way described in Herbert and Proctor, Telephony, vol. II, page 265. One of the call finders stops on the calling line. Then the relevant subscriber is switched through to the junction circuit. Thereupon the subscriber's set can be brought into operative condition by energizing the cut-off relay COR from the junction circuit. The contact *cor1* connects with its make-side the *1a*-wire with the relevant junction circuit, which *1a*-wire is connected there to +battery. The *1b*-wire is connected over the contact *cor2* to —battery. Owing to the operation of relay COR the current in the subscriber's loop is inverted.

Now the cell S1 will be in blocking condition while cell S2 will be conductive. Therefore relay B termed hereinafter the switching-in relay is energized by a current of about 40 mA., while the relay A is released.

It may be observed that the A relay is only inserted to render a mechanical locking of the calling key unnecessary.

The contact *b1* closes the circuit for relay H in the subscriber's set. Contacts *h4* and *h5* of this relay close the circuit of the teleprinter motor M. The contact *h3* of relay H closes a holding circuit for the relay H, while contact *h1* closes the circuit of the relay C termed hereinafter the switching-off relay, which is shunted by the blocking cell S3. The cell S3 which may consist only of one or two discs, is so arranged that it forms a short-circuit for the relay C in the operative condition of the subscriber's set. At the same time the relay B is short circuited, and thereby released. The subscriber's set has come into its operative condition in which a connection may be built up.

The calling of the subscriber's set is effected in almost the same way. For this purpose the subscriber's loop voltage is inverted in the exchange so that the relay B operates even though relay A has not been energized.

A connection can be released in two ways. If the subscriber himself wishes to release the connection, he presses the change-over key ST. By doing so the teleprinter coils are switched off, while the second winding of the relay C in series with the blocking cell S4 and contact *h2* is switched in. The arrangement of the blocking cell S4, however, is such that the line current of the operative condition cannot pass.

In consequence of this a guarding relay (not shown) is released in the central equipment (see von Schiweck Fernschreibtechnik, page 352) in consequence whereof the relay COR of the relevant connection is demagnetized. Owing to this the direction of the current in the subscriber's loop is re-inverted into the non-operative condition, enabling the relay C to operate over its second winding and to attract its armature. The contact *c1* breaks the holding circuit of the relay H. The teleprinter stops and the change-over key ST may be released. The line-relay LR should be a little slowly releasing in this arrangement in order not to operate again after the current in the subscriber's line has been re-inverted.

The resistance of the second winding of relay C which is in series with the blocking cell S4 can be chosen according to the aforementioned description.

The subscriber's set can also be restored into its normal condition only by inverting the current direction in the subscriber's loop in the exchange. In this case the cells S2 and S3 block, so that the relay C operates over the winding which is connected parallel to the blocking cell S3. The contact *c1* again breaks the circuit of relay H, so that this relay demagnetizes, whereupon the teleprinter stops. The contact *b2* is shown parallel to the non-operative side of the contact *h1* to prevent a premature demagnetization of the relay B when the subscriber's set is brought into the operative condition.

Fig. 2 is a modification of the arrangement according to the invention. The operation of the arrangement has remained quite the same. The relay A operates when the calling key OT is pressed. The relay B is operated after the subscriber's line has been switched into the operative position, while the relay A releases. Next relay H is energized short-circuiting with the contacts *h1* and *h2* the relay B, and switching the blocking cell S2 parallel to the relay C, the latter relay not being able to operate at the currents of the subscriber's line in the operative condition. Pressing the change-over key ST, having two movable contacts ST1, ST2, arranges the relay C in series with blocking cell S2 in such a way that no working current can flow in the subscriber's line over this circuit. Now, however, relay C cannot operate and relay H is not released before the central equipment has inverted the subscriber's loop.

I claim:

1. A relay arrangement for a subscriber's station in a telegraph system having means for inverting and re-inverting the current in the subscriber's station including a teleprinter, comprising in combination, a relay having contacts controlling the teleprinter; a non-polarized switching-in relay having a normally open contact connected in series with said relay controlling the teleprinter; a first blocking cell connected in series to said switching-in relay for blocking the passage of re-inverted current and allowing the passage of an inverted current; a non-polarized switching-off relay having a normally closed contact connected in series to said normally open contact of said switching-in relay; a normally open contact controlled by said relay controlling the teleprinter and connected in series with said switching-off relay; a second blocking cell connected in series to said switching-off relay and blocking the passage of the inverted current; and a change-over key connected in inoperative position in series to said switching-in relay and connected in operative position in series to said switching-off relay.

2. A relay arrangement for a subscriber's station in a telegraph system having means for inverting and re-inverting the current in the subscriber's station including a teleprinter, comprising in combination, a relay having contacts controlling the teleprinter; a non-polarized switching-in relay having a normally open contact connected in series with said relay controlling the teleprinter; a first blocking cell connected in series to said switching-in relay for blocking the passage of re-inverted current and allowing the passage of an inverted current; a non-polarized switching-off relay having a normally closed contact connected in series to said normally open contact of said switching-in relay; said switching-off relay having a first winding and a second winding; contacts controlled by said relay controlling the teleprinter and connected in series, respectively, with said first winding and said second winding; a second blocking cell connected in series to said second winding and blocking the passage of the inverted current; a third blocking cell connected in shunt with said first winding and allowing the passage of an inverted current; said first winding of said switching-off relay being connected in shunt to said switching-in relay and said first blocking cell connected in series therewith; and a change-over key connected in inoperative position in series to said switching-in relay and connected in operative position in series to said second winding of said switching-off relay.

3. A relay arrangement for a subscriber's station in a telegraph system having means for inverting and re-inverting the current in the subscriber's station including a teleprinter, comprising in combination, a relay having contacts controlling the teleprinter; a non-polarized switching-in relay having a normally open contact connected in series with said relay controlling the teleprinter; a blocking cell connected in series to said switching-in relay for blocking the passage of re-inverted current and allowing the passage of an inverted current; a non-polarized switching-off relay having a normally closed contact connected in series to said normally open contact of said switching-in relay; a normally open contact controlled by said relay controlling the teleprinter and connected in series with said switching-off relay; a change-over key connecting in inoperative position said switching-in relay and said blocking cell in series with the subscriber's line and connecting in operative position said switching-off relay in series with said blocking cell.

ROELOF M. M. OBERMAN.

REFERENCES CITED

The following references are of record in the file of this patent:

UNITED STATES PATENTS

| Number | Name | Date |
|---|---|---|
| 2,334,876 | Janson | Nov. 23, 1943 |
| 2,424,554 | Cornu | July 29, 1947 |

FOREIGN PATENTS

| Number | Country | Date |
|---|---|---|
| 363,696 | Great Britain | Dec. 21, 1931 |